Sept. 7, 1926.
J. LEHR
1,599,054
METHOD OF MAKING RUBBER SPONGES
Filed April 2, 1926
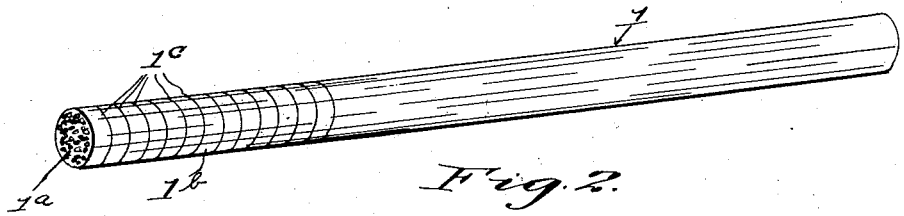
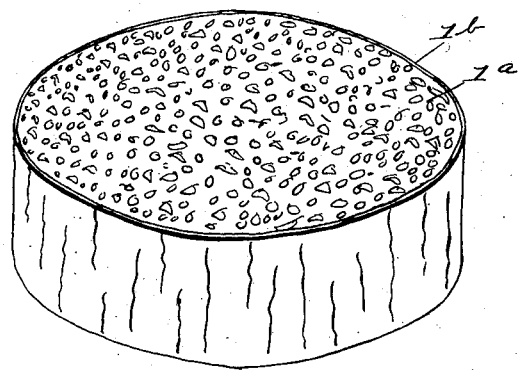
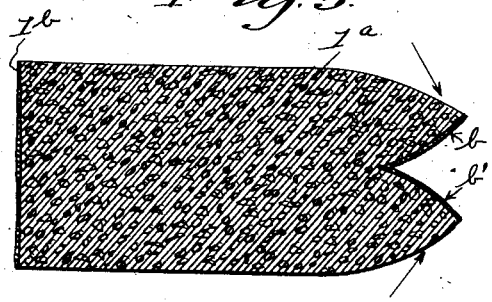
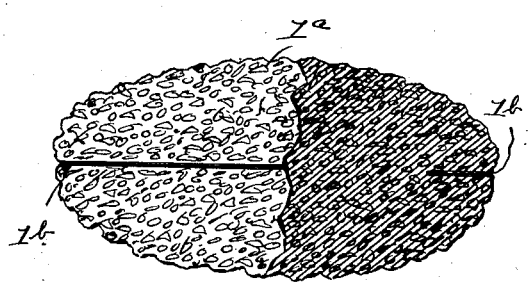
Inventor
John Lehr
By Spear Middleton Donaldson & Hall
Attorney Patented Sept. 7, 1926.

1,599,054

UNITED STATES PATENT OFFICE.

JOHN LEHR, OF AKRON, OHIO, ASSIGNOR TO THE MILLER RUBBER COMPANY, OF AKRON, OHIO, A CORPORATION OF OHIO.

METHOD OF MAKING RUBBER SPONGES.

Application filed April 2, 1926. Serial No. 99,347.

My present invention relates to an improved method of manufacturing rubber sponges such as are commonly used for bathing purposes.

So far as I am aware, the rubber sponges heretofore placed on the market have been manufactured in two ways. The oval shaped sponge has been made by placing a batch of rubber compound of the proper amount and containing a blower, in a mold having a cavity corresponding to the desired size of sponge, which is subjected to vulcanizing temperature to expand the blower to produce the cells in the compound and vulcanize the article. This necessarily produces a skin covering the entire outer surface of the sponge, which has been removed by trimming on a suitable trimming machine, which is not only an expensive operation, due to the fact that the article must be manipulated by hand until all portions of the surface have been acted upon by the trimmer, but a considerable amount of waste ensues.

The other method which is resorted to as producing a cheaper article, but one which is not generally regarded as so desirable, is to manufacture the sponge material in the shape of a long cylinder having, of course, the outer skin, which cylinder is cut up into sections and the peripheral skin removed on a trimming machine. Due to the fact that the skin in this case is of cylindrical form, the trimming is facilitated, but the article produced is of cylindrical shape instead of oval shape, which is less desirable from a commercial standpoint.

The present invention aims to provide a process by which an oval sponge may be produced from a cylindrical section such as last described, without the necessity of trimming, but which oval sponge will have its entire curved surface of an open cellular nature and free from skin.

The invention comprises the novel method of procedure hereinafter described and defined by the appended claims.

In order that my invention may be better understood, reference is made to the accompanying drawings, in which:—

Figure 1 is a perspective view of a relatively long cylinder of rubber from which the blocks for forming the individual sponges are cut.

Fig. 2 is a perspective view on a larger scale, illustrating one of the blocks separated therefrom.

Fig. 3 is a transverse sectional view illustrating the method of procedure, and

Fig. 4 is a side elevation, partly in section, illustrating the completed article.

Referring by reference characters to these drawings, I have indicated at 1 a cylinder of rubber having an interior cellular formation indicated at $1^a$, and a skin $1^b$, which cylinder may be produced in the customary manner and of any convenient length, the cross sectional shape and size being made to correspond to the desired shape and size of sponge. Such a cylinder I divide by transverse cuts $1^c$ into a plurality of cylindrical blocks such as shown in Fig. 2, each of which, of course, will have a cylindrical skin surface $1^b$ and parallel surfaces in which the cellular structure $1^a$ appears.

Thereafter I apply to the skin surface $1^b$ a coating of cement (rubber cement of the usual or any desired nature), whereupon the face portions of the skin on each side of the median line are pressed towards each other until these skin portions, indicated respectively at $b$ and $b'$, are caused to come in contact and adhere together by reason of the adhesive nature of the cement, which permanently secures them together by a joint which will not be effected by the action of water. Such pressure may be applied by any convenient means as for example by pressure of the finger and thumb applied progressively around the entire circumference of the cylinder, whereby a sponge is produced having a surface curved continuously throughout, and of an open cellular nature, as only the juxtaposed edges of the skin appear at the exterior, which skin is not of appreciable thickness and hence does not detract from the appearance or the effectiveness of the sponge.

Having thus described my invention, what I claim is:—

1. The hereindescribed method of making rubber sponges having surfaces curved throughout their entire extent, from cylindrical blocks of rubber having exposed cells on the parallel faces and a skin on the curved face, which consists in applying cement to said skin and then folding the skin on a peripheral median line to bring the portions on each side of the median line into contact.

2. The hereindescribed method of making rubber sponges having surfaces curved throughout their entire extent, from cylindrical blocks of rubber having exposed cells on the parallel faces and a skin on the curved face, which consists in applying cement to said skin and then progressively folding the skin on a peripheral median line to bring the portions on each side of the median line into contact.

3. The hereindescribed method of making rubber sponges, which consists in producing a cylinder or rubber having a spongy interior and peripheral skin, cutting said cylinder transversely to produce cylindrical blocks, applying cement to the peripheral skin of said blocks, and folding said peripheral skin on a median line, and pressing the portions on each side of said median line into adhering contact.

In testimony whereof, I affix my signature.

JOHN LEHR.